(12) United States Patent
Yuasa et al.

(10) Patent No.: US 9,628,916 B2
(45) Date of Patent: Apr. 18, 2017

(54) LOUDSPEAKER, ELECTRONIC APPARATUS USING LOUDSPEAKER, AND MOBILE EQUIPMENT USING LOUDSPEAKER

(71) Applicant: Panasonic Intellectual Property Management Co., Ltd., Osaka (JP)

(72) Inventors: Takafumi Yuasa, Osaka (JP); Kenji Yamauchi, Mie (JP); Satoshi Takayama, Mie (JP); Koichi Nakayama, Okayama (JP); Ryo Kuribayashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/023,681

(22) PCT Filed: Mar. 23, 2015

(86) PCT No.: PCT/JP2015/001605
§ 371 (c)(1),
(2) Date: Mar. 22, 2016

(87) PCT Pub. No.: WO2015/146117
PCT Pub. Date: Oct. 1, 2015

(65) Prior Publication Data
US 2016/0234601 A1 Aug. 11, 2016

(30) Foreign Application Priority Data
Mar. 27, 2014 (JP) .................................. 2014-065177

(51) Int. Cl.
*H04R 1/02* (2006.01)
*H04R 7/12* (2006.01)
(Continued)

(52) U.S. Cl.
CPC .......... *H04R 7/125* (2013.01); *B60R 11/0217* (2013.01); *G02B 6/0055* (2013.01);
(Continued)

(58) Field of Classification Search
CPC ........ H04R 7/125; H04R 1/025; H04R 1/028; B60R 11/0217
See application file for complete search history.

(56) References Cited

U.S. PATENT DOCUMENTS

| 5,581,624 | A |   | 12/1996 | Geisenberger et al. |
| 6,819,767 | B1 | * | 11/2004 | Funahashi ................ H04R 5/02 381/182 |

(Continued)

FOREIGN PATENT DOCUMENTS

| EP | 1802167 | A2 | 6/2007 |
| EP | 3113503 | A1 | 1/2017 |

(Continued)

OTHER PUBLICATIONS

International Search Report of PCT application No. PCT/JP2015/001605 dated Jun. 9, 2015.

(Continued)

*Primary Examiner* — Simon King
(74) *Attorney, Agent, or Firm* — McDermott Will & Emery LLP

(57) ABSTRACT

A loudspeaker includes a light-emitting element, a frame, a magnetic circuit provided with a magnetic gap, a diaphragm, a voice coil bobbin, and a voice coil. The diaphragm includes an inner peripheral end portion having an end face to which a light-emitting element is coupled, a light-guide portion, a reflective surface, and an outer peripheral end portion coupled to the frame. The first end of the voice coil bobbin is coupled to the inner peripheral end portion of the diaphragm, and the second end thereof is inserted into the (Continued)

magnetic gap. A voice coil is wound on the second end of the voice coil bobbin.

18 Claims, 18 Drawing Sheets

(51) Int. Cl.
    *B60R 11/02*     (2006.01)
    *F21V 8/00*     (2006.01)
    *H04R 9/02*     (2006.01)
    *H04R 9/04*     (2006.01)
    *F21V 33/00*     (2006.01)

(52) U.S. Cl.
    CPC .............. *H04R 1/025* (2013.01); *H04R 1/028* (2013.01); *H04R 7/12* (2013.01); *H04R 9/025* (2013.01); *H04R 9/04* (2013.01); *F21V 33/0056* (2013.01); *H04R 9/045* (2013.01); *H04R 2307/021* (2013.01); *H04R 2307/025* (2013.01); *H04R 2307/029* (2013.01); *H04R 2499/11* (2013.01)

(56) References Cited

U.S. PATENT DOCUMENTS

| | | | | |
|---|---|---|---|---|
| 7,123,738 | B1* | 10/2006 | Mizone | F21S 10/02 381/333 |
| 2010/0316247 | A1* | 12/2010 | Ding | H04R 1/028 381/397 |
| 2011/0235845 | A1* | 9/2011 | Wang | H04R 1/26 381/386 |
| 2011/0277361 | A1 | 11/2011 | Nichol et al. | |
| 2012/0008818 | A1 | 1/2012 | Ohashi et al. | |
| 2014/0192513 | A1* | 7/2014 | Yim | F21V 33/0056 362/86 |
| 2016/0084493 | A1* | 3/2016 | Salter | F21V 33/0056 362/510 |
| 2016/0119459 | A1* | 4/2016 | Clementson | H04M 1/22 379/396 |

FOREIGN PATENT DOCUMENTS

| | | |
|---|---|---|
| FR | 2781971 A1 | 2/2000 |
| JP | 63-033414 U | 3/1988 |
| JP | 1-175097 U | 12/1989 |
| JP | 2-103987 U | 8/1990 |
| JP | 6-245297 A | 9/1994 |
| JP | 2004-007308 | 1/2004 |
| JP | 2005-303498 A | 10/2005 |
| JP | 2009-164696 | 7/2009 |
| JP | 2010-124322 | 6/2010 |
| JP | 2012-019347 | 1/2012 |

OTHER PUBLICATIONS

The Extended European Search Report dated Mar. 1, 2017 for the related European Patent Application No. 1576908T6.
The Extended European Search Report dated Feb. 7, 2017 for the related European Patent Application No. 15754755.5.

* cited by examiner

LOUDSPEAKER, ELECTRONIC APPARATUS USING LOUDSPEAKER, AND MOBILE EQUIPMENT USING LOUDSPEAKER

TECHNICAL FIELD

The present technical field relates to a loudspeaker having an illumination function, an electronic apparatus using the loudspeaker, and a mobile apparatus using the loudspeaker.

BACKGROUND ART

In a conventional loudspeaker having an illumination function, for example, a light source is disposed in front of a diaphragm so that light from the light source is reflected by the diaphragm. Alternatively, a light source is disposed behind the diaphragm so that the light from the light source passes through the diaphragm.

Note here that as prior art literatures relating to the invention of the present application, PTL 1 is known, for example.

CITATION LIST

Patent Literature

PTL 1: Japanese Utility Model Examined Publication No. S63-33414

SUMMARY OF THE INVENTION

The present invention provides a loudspeaker capable of suppressing irregularity in brightness, and achieving high quality illumination.

A loudspeaker of the present invention includes a light-emitting element, a frame, a magnetic circuit provided with a magnetic gap, a diaphragm, a voice coil bobbin, and a voice coil. The diaphragm includes an inner peripheral end portion having an end face to which the light-emitting element is coupled, a light-guide portion provided in a direction toward an outer periphery from the inner peripheral end portion, a reflective surface provided on a back face of the light-guide portion, and an outer peripheral end portion coupled to the frame.

In the above-mentioned configuration, light of the light-emitting element enters the diaphragm from the end face thereof, is diffused by the light-guide portion, and is reflected by the reflective surface. Therefore, light from a front face of the diaphragm does not have irregularity in brightness. Accordingly, the diaphragm seems to shine uniformly, and high quality illumination can be expressed.

DESCRIPTION OF EMBODIMENTS

Prior to description of loudspeakers in accordance with the present exemplary embodiment, problems of a conventional loudspeaker are described.

In a conventional reflection-type loudspeaker, in a case where the light source is disposed in the center, a support body for supporting the light source interrupts reflected light from the diaphragm, thus causing irregularity in brightness. Furthermore, in a case where a plurality of light sources is disposed in the periphery or back of the diaphragm, the distance from the light source to the diaphragm may not sufficiently be secured, thus causing irregularity in brightness due to difference in distances from the light sources to the diaphragm.

Hereinafter, loudspeaker 11 in accordance with an exemplary embodiment of the present invention is described with reference to drawings.

Figure 1:
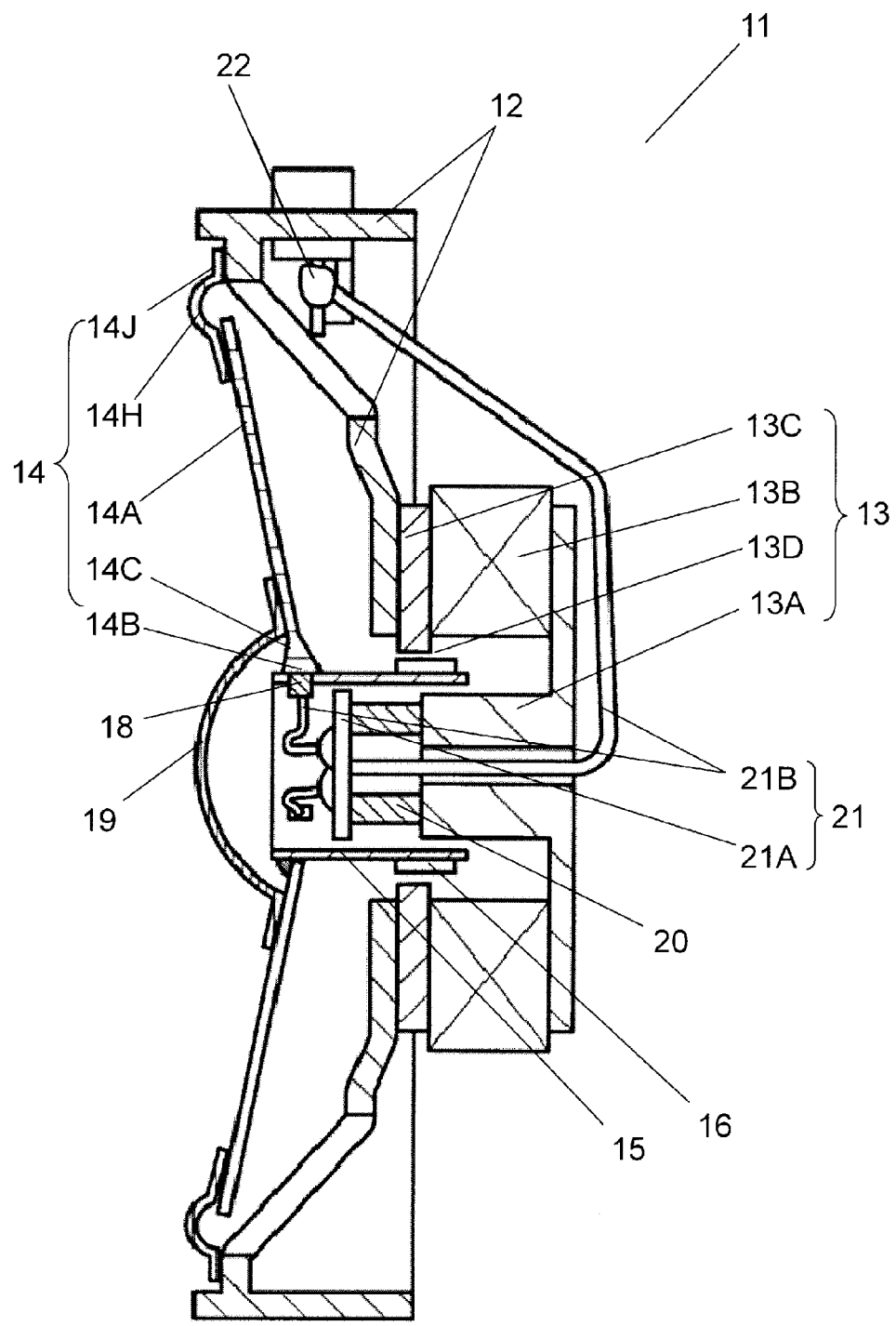
FIG. 1 is a sectional view of a loudspeaker in accordance with an exemplary embodiment of the present invention.
Figure 2:
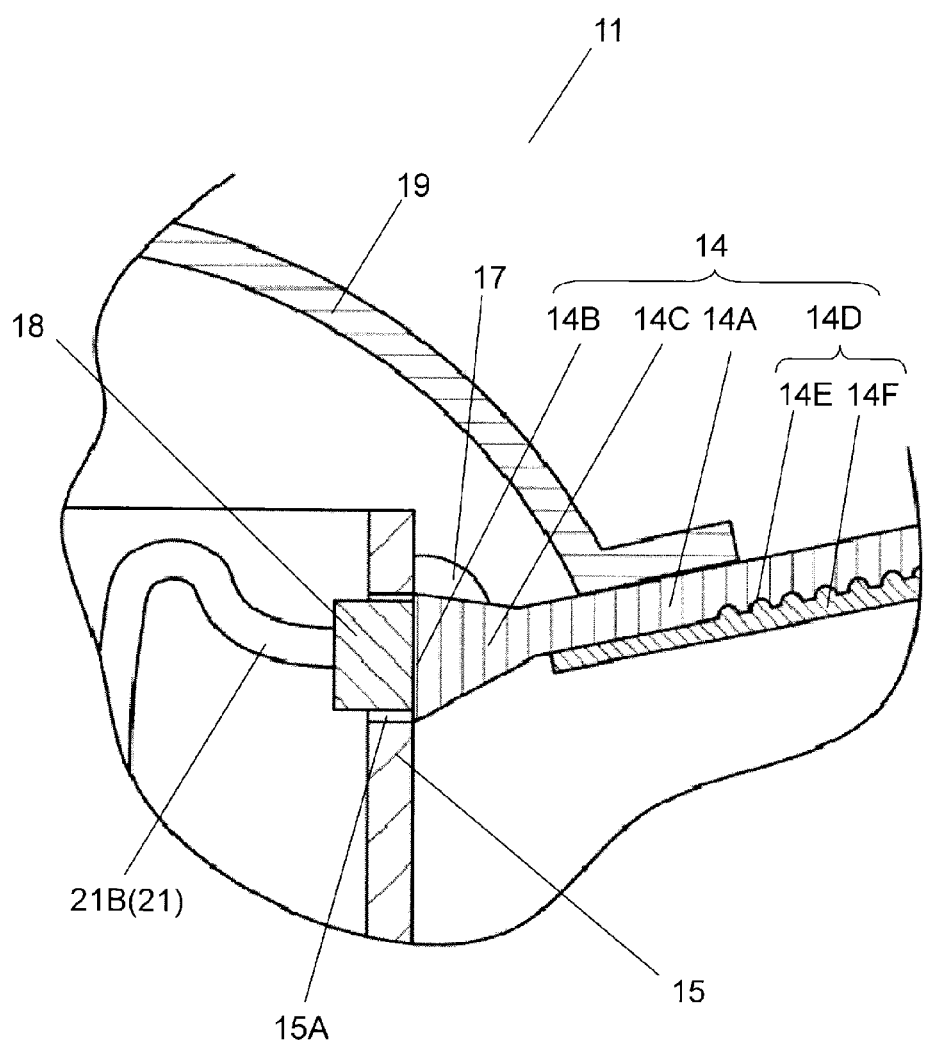
FIG. 2 is an enlarged sectional view of a principal part of the loudspeaker in accordance with the exemplary embodiment of the present invention.

FIG. 1 is a sectional view of loudspeaker 11. FIG. 2 is an enlarged sectional view of a principal part of loudspeaker 11. Loudspeaker 11 includes frame 12, magnetic circuit 13 provided with magnetic gap 13D, diaphragm 14, voice coil bobbin 15, voice coil 16, light emitting diode (hereinafter, referred to as "LED") 18 as a light-emitting element, external terminal 22, and wire portion 21. Magnetic circuit 13 is coupled to the center of a back face of frame 12.

Outer peripheral end portion 14J of diaphragm 14 is linked to an outer peripheral part of frame 12. Diaphragm 14 is formed of transmissive resin. Diaphragm 14 can be formed of, for example, thermoplastic resin such as polycarbonate (PC) and acrylic. Therefore, diaphragm 14 is excellent in productivity because it can be molded by injection molding. Note here that diaphragm 14 is a cone-shaped, but it is not limited to this shape and may be a plane-shaped. Diaphragm 14 includes inner peripheral end portion 14C, and plate-shaped light-guide portion 14A provided in the direction toward an outer periphery from inner peripheral end portion 14C. Note here that inner peripheral end portion 14C is formed on the end portion at the inner peripheral side of diaphragm 14. Furthermore, diaphragm 14 has reflective surface 14D on the back face of light-guide portion 14A.

Diaphragm 14 includes edge 14H. In this case, edge 14H is linked to an end portion at the outer peripheral side of the light-guide portion 14A. The outer peripheral part of edge 1411 is coupled to the outer peripheral part of frame 12. That is to say, light-guide portion 14A is linked to frame 12 via edge 14H. Edge 14H is attached to a front face of diaphragm 14, and has a shape protruding toward the front side of diaphragm 14.

Voice coil bobbin 15 has first and second ends. Voice coil 16 is wound on the second end. The first end of voice coil bobbin 15 is coupled to end face 14B of diaphragm 14. End face 14B has a shape along an outer peripheral surface of voice coil bobbin 15, and closely coupled to the outer peripheral surface. On the other hand, the second end is inserted into magnetic gap 13D.

As shown in FIG. 2, voice coil bobbin 15 has window 15A. Window 15A is provided through a lateral surface of voice coil bobbin 15. Note here that window 15A is provided at a position of end face 14B, and LED 18 is coupled to end face 14B. Accordingly, LED 18 is disposed so as to penetrate through window 15A on the inner side of voice coil bobbin 15.

Note here that a light-emitting surface of LED 18 faces end face 14B. With this configuration, light output from LED 18 enters end face 14B, and is guided to light-guide portion 14A via inner peripheral end portion 14C. Note here that inner peripheral end portion 14C and end face 14B may be formed on the entire circumference on the inner side of diaphragm 14. As LED 18, for example, a full-color type can be used. Note here that LED 18 is not necessarily limited to the full-color type, and it may be a single-color type. Furthermore, the light emitting element is not necessarily limited to LED 18. Instead of LED 18, a light-emitting element such as electroluminescence (EL) element may be used.

As shown in FIG. 1, external terminal 22 is attached to frame 12. Wire portion 21 electrically connects external terminal 22 with LED 18. Note here that wire portion 21 may include lead wire 21B. In addition, wire portion 21 may include printed wiring board 21A. In this case, LED 18 is installed on printed wiring board 21A by, for example, soldering. Furthermore, wire portion 21 may include printed wiring board 21A and lead wire 21B. In this case, printed wiring board 21A is electrically connected to external terminal 22 via lead wire 21B. With this configuration, LED 18 is driven based on a signal input into external terminal 22.

Furthermore, it is preferable that LED 18 and printed wiring board 21A are also connected to each other via lead wire 21B. With this configuration, it is possible to suppress interruption of vibration of voice coil bobbin 15 due to weight of printed wiring board 21A.

With the above-mentioned configuration, light incident from end face 14B of inner peripheral end portion 14C of diaphragm 14 is reflected repeatedly inside diaphragm 14 while the light diffuses toward the outer periphery. In addition, in light-guide portion 14A, the light is reflected to the front side by reflective surface 14D provided on the back face side. Consequently, uniformized light is emitted from the front face of diaphragm 14.

Next, loudspeaker 11 in accordance with this exemplary embodiment is described in more detail. Firstly, diaphragm 14 is described. As shown in FIG. 2, reflective surface 14D can be made by, for example, forming plate-shaped projection 14E on the back face of light-guide portion 14A. In this case, plate-shaped projection 14E can be molded at the same time when diaphragm 14 is formed. Therefore, productivity of diaphragm 14 is high.

Alternatively, reflective surface 14D may be formed by providing the back face of diaphragm 14 with resin coating film 14F capable of reflecting light. In this case, making resin coating film 14F to include a reinforcing agent allows elastic modulus of diaphragm 14 to be improved. Use of, for example, plant opal extracted from bamboo or nanofiber extracted from bamboo as the reinforcing agent improves the elastic modulus and binding degree between the resin of coating film 14F and the reinforcing agent.

Note here that it is preferable that inner peripheral end portion 14C is thicker than light-guide portion 14A. This configuration improves the efficiency at which light enters light-guide portion 14A. In this case, it is preferable that the thickness of inner peripheral end portion 14C is gradually reduced from end face 14B toward light-guide portion 14A. This configuration improves the efficiency at which light enters light-guide portion 14A.

Voice coil bobbin 15 has a cylindrical shape. It is preferable that end face 14B is in contact with the outer peripheral surface of voice coil bobbin 15.

Adhesive-bonding portion 17 can be formed so as to couple voice coil bobbin 15 and diaphragm 14 to each other by using, for example, an adhesive agent. It is preferable that adhesive-bonding portion 17 is formed between the outer peripheral surface of voice coil bobbin 15 and the front face of diaphragm 14. Note here that adhesive-bonding portion 17 is formed not only between the outer peripheral surface of voice coil bobbin 15 and the front face of diaphragm 14 but also between the outer peripheral surface of voice coil bobbin 15 and the back face of diaphragm 14.

LED 18 is adhesively bonded to inner peripheral end portion 14C such that the light-emitting surface of LED 18 is coupled to end face 14B. LED 18 is preferably of a front light-emitting type. This configuration can improve the efficiency at which light enters light-guide portion 14A. Note here that LED 18 is not necessarily limited to the front light-emitting type, but it may be of a side light-emitting type. Furthermore, LED 18 may be of a wide-range light-emitting type.

Figure 3:
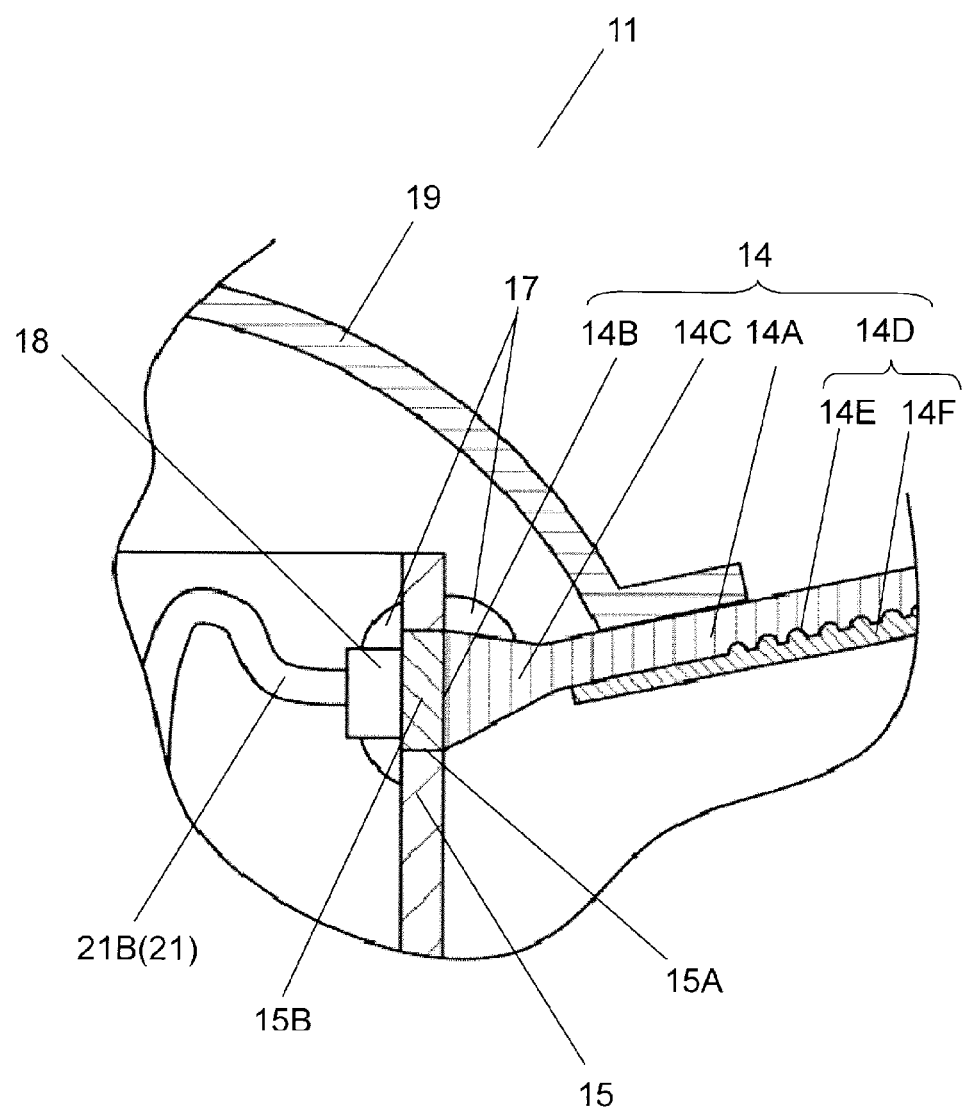
FIG. 3 is an enlarged sectional view of a principal part of a loudspeaker in a case where a light-emitting element is coupled to an inner peripheral end portion of a diaphragm via an intermediate layer in accordance with the exemplary embodiment of the present invention.

As shown in FIG. 3, LED 18 may be coupled to end face 14B via intermediate layer 15B provided to window 15A and including transmissive material. In this case, it is preferable that the material of intermediate layer 15B has a refractive index between those of LED 18 and diaphragm 14. With this configuration, reflection on end face 14B can be suppressed. Consequently, the efficiency of the light incident on diaphragm 14 can be improved.

Figure 4:
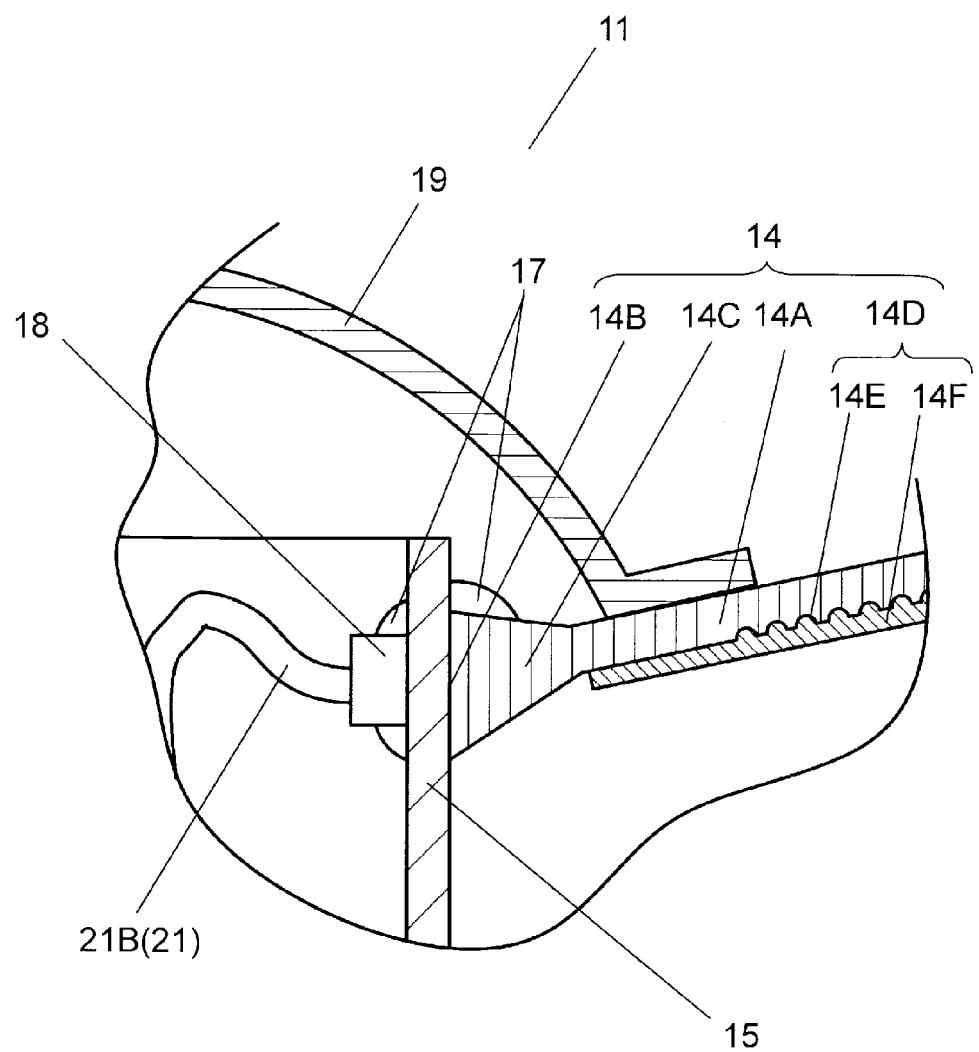
FIG. 4 is an enlarged sectional view of a principal part of a loudspeaker in a case where a light-emitting element is coupled to an inner peripheral end portion of a diaphragm via a transmissive voice coil bobbin in accordance with the exemplary embodiment of the present invention.

Voice coil bobbin 15 may be formed of transmissive material. In this case, as shown in FIG. 4, LED 18 can be coupled to end face 14B via voice coil bobbin 15 itself.

Figure 5:
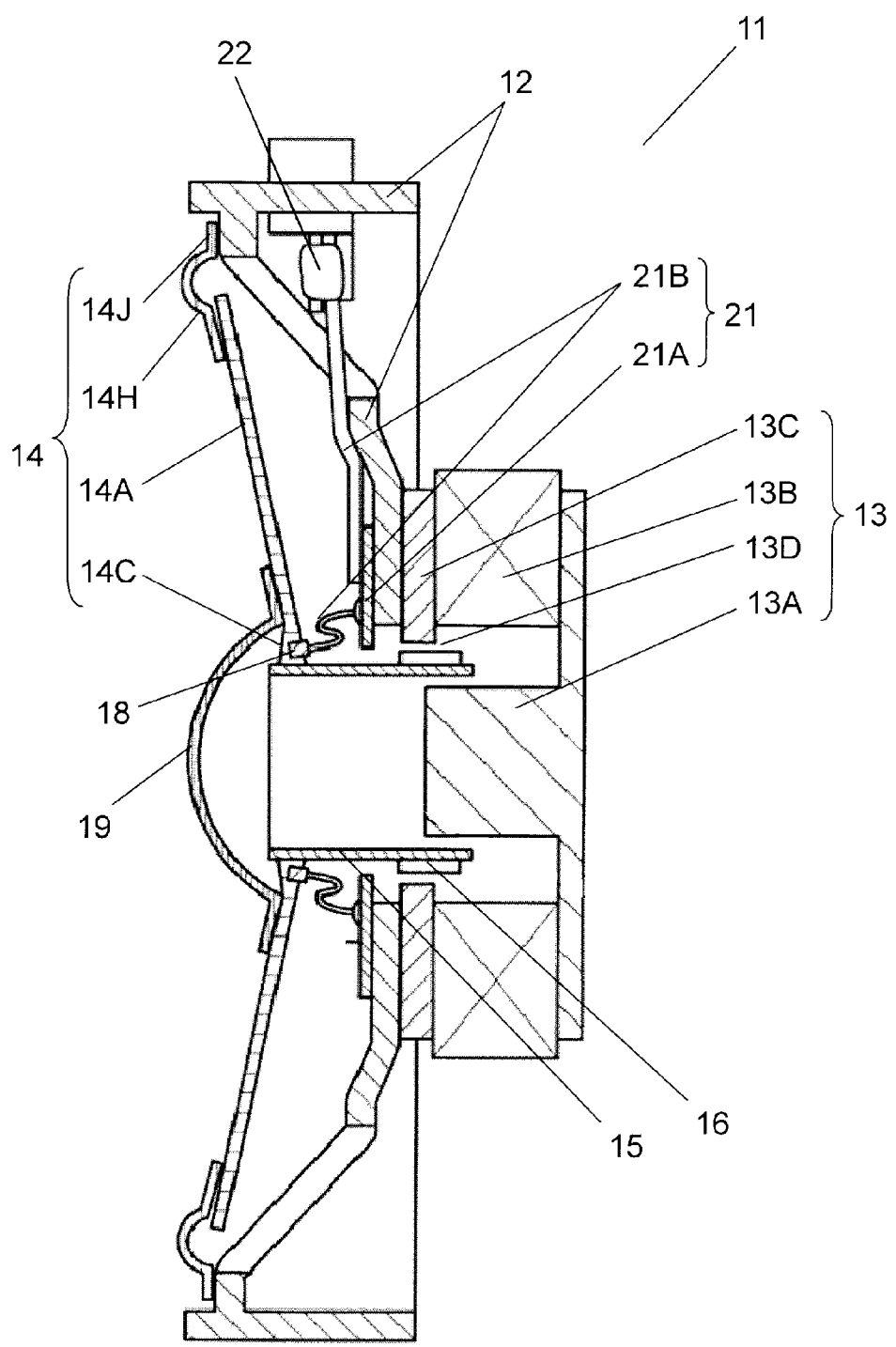
FIG. 5 is a sectional view of a loudspeaker in a case where a light-emitting element is embedded in an inner peripheral end portion of a diaphragm in accordance with the exemplary embodiment of the present invention.

Furthermore, as shown in FIG. 5, a part or an entire part of LED 18 may be embedded into the back face of inner peripheral end portion 14C. With this configuration, LED 18 can be embedded at the same time when diaphragm 14 is molded, and therefore the productivity is improved. In this case, as LED 18, a side light-emitting type is preferably used. With this configuration, since terminals of LED 18 are disposed on the back face side of diaphragm 14, wiring can be carried out by lead wire 21B.

Note here that in FIGS. 2 to 5, inner peripheral end portion 14C may be formed on the entire circumference on the inner side of diaphragm 14. With this configuration, assembly man-hours of diaphragm 14 can be reduced when diaphragm 14 is coupled to frame 12.

Figure 6:
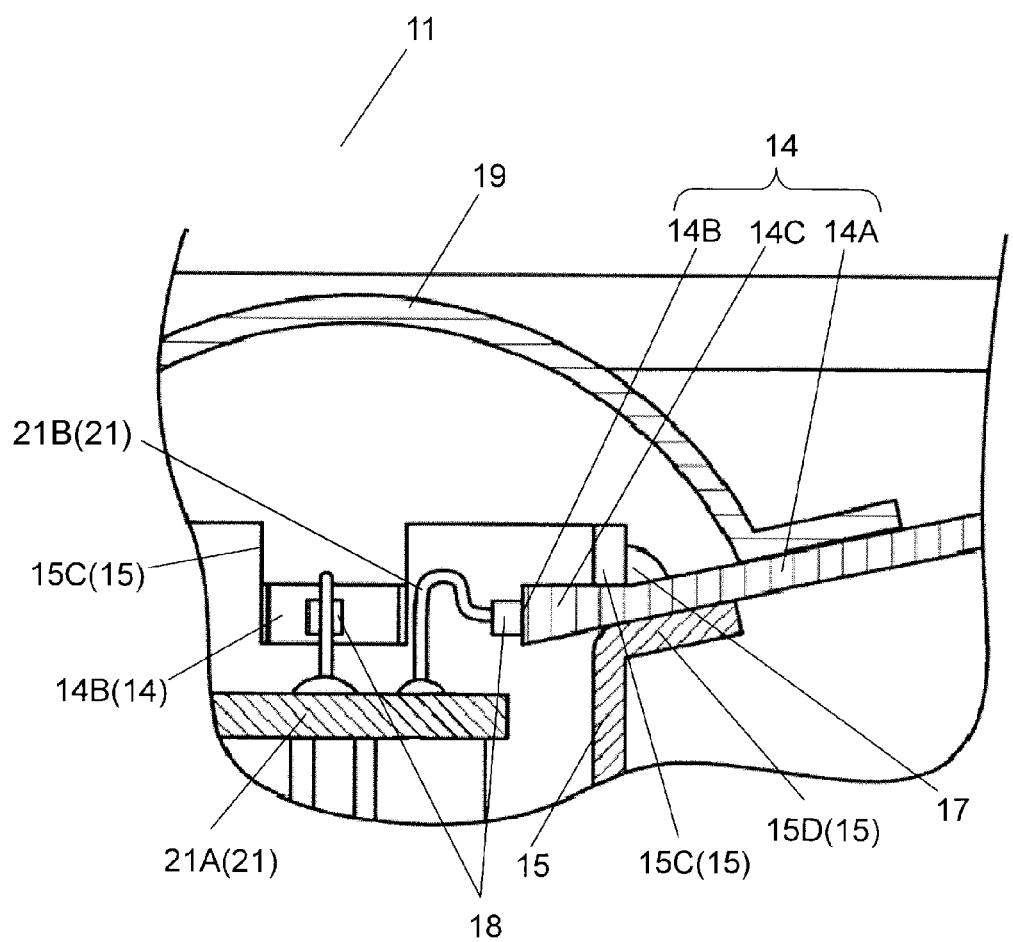
FIG. 6 is an enlarged sectional view of a principal part of a loudspeaker in a case where a voice coil bobbin provided with a notch is used in accordance with the exemplary embodiment of the present invention.
Figure 7:
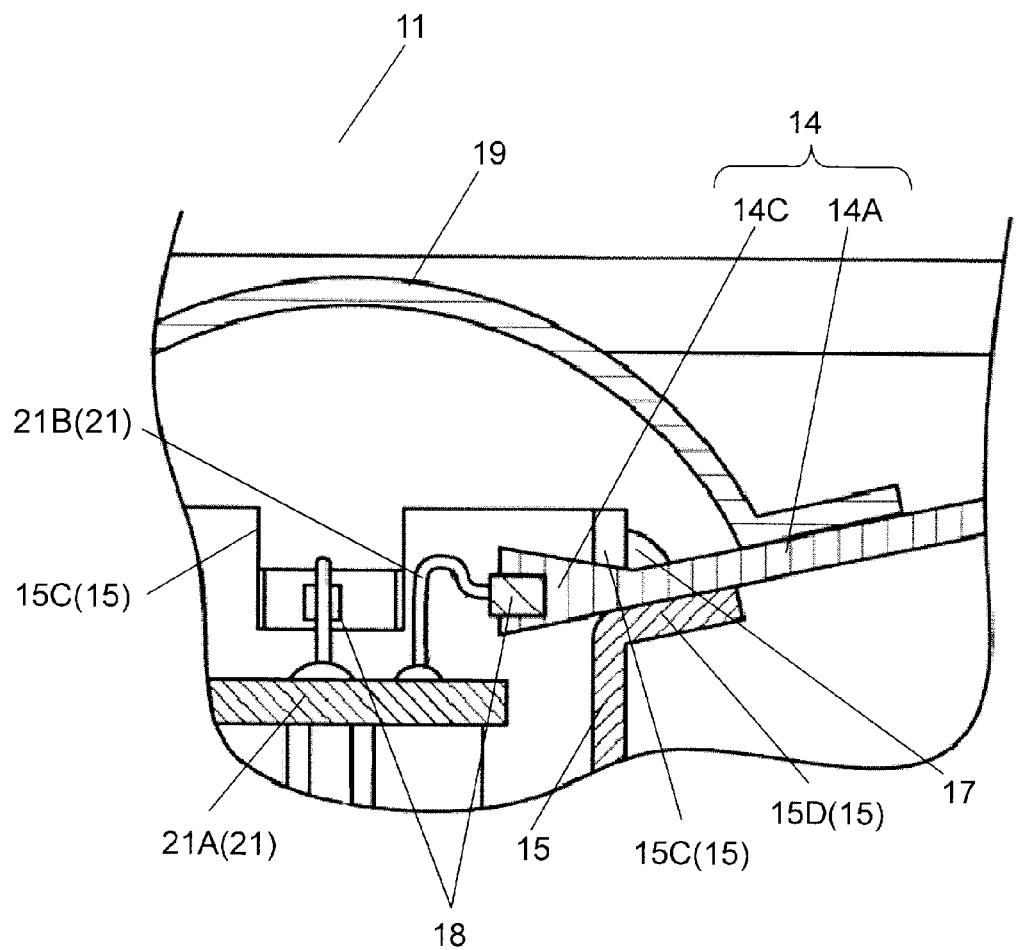
FIG. 7 is an enlarged sectional view of a principal part of a loudspeaker in a case where a voice coil bobbin having a notch is used and a light-emitting element is embedded in an inner peripheral end portion of a diaphragm in accordance with the exemplary embodiment of the present invention.

Each of FIGS. 6 and 7 is an enlarged sectional view of a principal part of loudspeaker 11 using voice coil bobbin 15 provided with notch 15C. In FIG. 6, notch 15C is formed in a position in which LED 18 is disposed at a first end of voice coil bobbin 1. In this case, it is preferable that inner peripheral end portion 14C protrudes into the inner side of voice coil bobbin 15. That is to say, inner peripheral end portion 14C is disposed to protrude inwardly from the inner peripheral surface of voice coil bobbin 15. Adhesive-bonding portion 17 is provided between the outer peripheral part of voice coil bobbin 15 and the front face of diaphragm 14. Note here that adhesive-bonding portion 17 may be formed between the inner peripheral surface of voice coil bobbin 15 and the back face of diaphragm 14. Alternatively, adhesive-bonding portion 17 may be formed between the inner peripheral surface of voice coil bobbin 15 and the front face of diaphragm 14. Note here that not only the configuration in which inner peripheral end portion 14C protrudes from the inner peripheral surface of voice coil bobbin 15, but also a configuration in which inner peripheral end portion 14C protrudes to the inner peripheral surface of voice coil bobbin 15 may be employed. Alternatively, inner peripheral end portion 14C may be disposed outside of notch 15C.

In addition, notch 15C may be provided with bending portion 15D. In bending portion 15D, a part of the first end of voice coil bobbin 15 bends along the back face of diaphragm 14. In this case, it is preferable that voice coil bobbin 15 is made of a member capable of reflecting light. With this configuration, bending portion 15D reflects light output from LED 18. Consequently, light can be guided to light-guide portion 14A efficiently. Note here that it is preferable that bending portion 15D and diaphragm 14 are coupled to each other with, for example, an adhesive agent. This configuration can improve strength of coupling between voice coil bobbin 15 and diaphragm 14. Note here that the bending direction of bending portion 15D is not limited to the outward direction of voice coil bobbin 15 but may be the inward direction.

As shown in FIG. 7, LED 18 may be coupled to inner peripheral end portion 14C by embedding a part or an entire part of LED 18 into inner peripheral end portion 14C. With this configuration, since coupling of LED 18 can be carried out at the same time when diaphragm 14 is molded, the productivity is improved.

Figure 8:
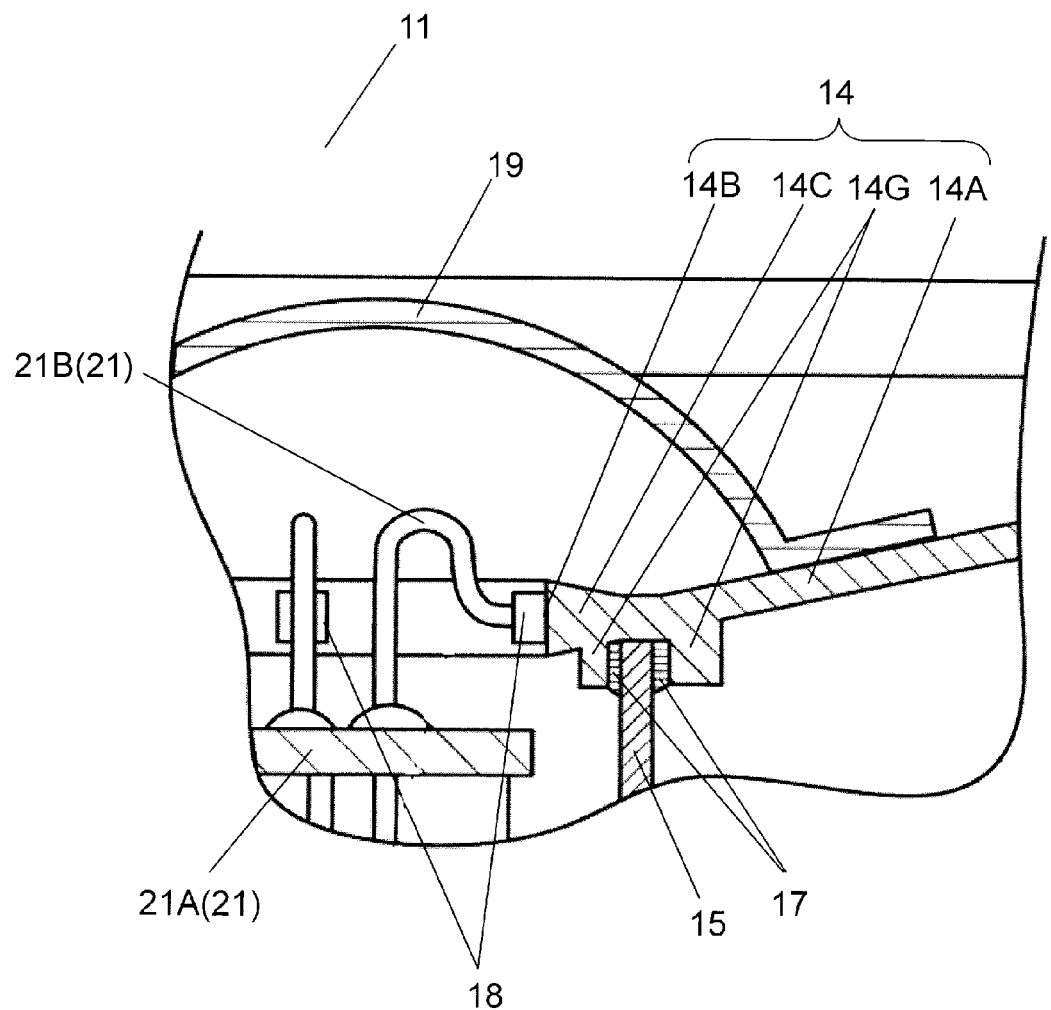
FIG. 8 is an enlarged sectional view of a principal part of a loudspeaker in a case where a voice coil bobbin is coupled to a back face of a diaphragm in accordance with the exemplary embodiment of the present invention.

FIG. 8 is an enlarged sectional view of a principal part of loudspeaker 11 in a case where voice coil bobbin 15 is coupled to the back face of diaphragm 14. The first end of voice coil bobbin 15 is coupled to the back face of diaphragm 14. In this case, adhesive-bonding portion 17 is formed between the first end of voice coil bobbin 15 and the back face of diaphragm 14. With this configuration, an entire part of inner peripheral end portion 14C protrudes inwardly from the inner peripheral surface of voice coil bobbin 15. In this case, it is preferable that inner peripheral end portion 14C is formed on the entire circumference on the inner side of diaphragm 14.

Furthermore, the back face of diaphragm 14 may have projection 14G. In this case, it is preferable that adhesive-bonding portion 17 is formed between the inner and outer lateral surfaces of the first end of voice coil bobbin 15 and the lateral surface of projection 14G. Note here that projection 14G may be provided to only one of the inner peripheral surface and the outer peripheral surface on the first end side of voice coil bobbin 15. This configuration can increase the strength of coupling between voice coil bobbin 15 and diaphragm 14.

Figure 9:
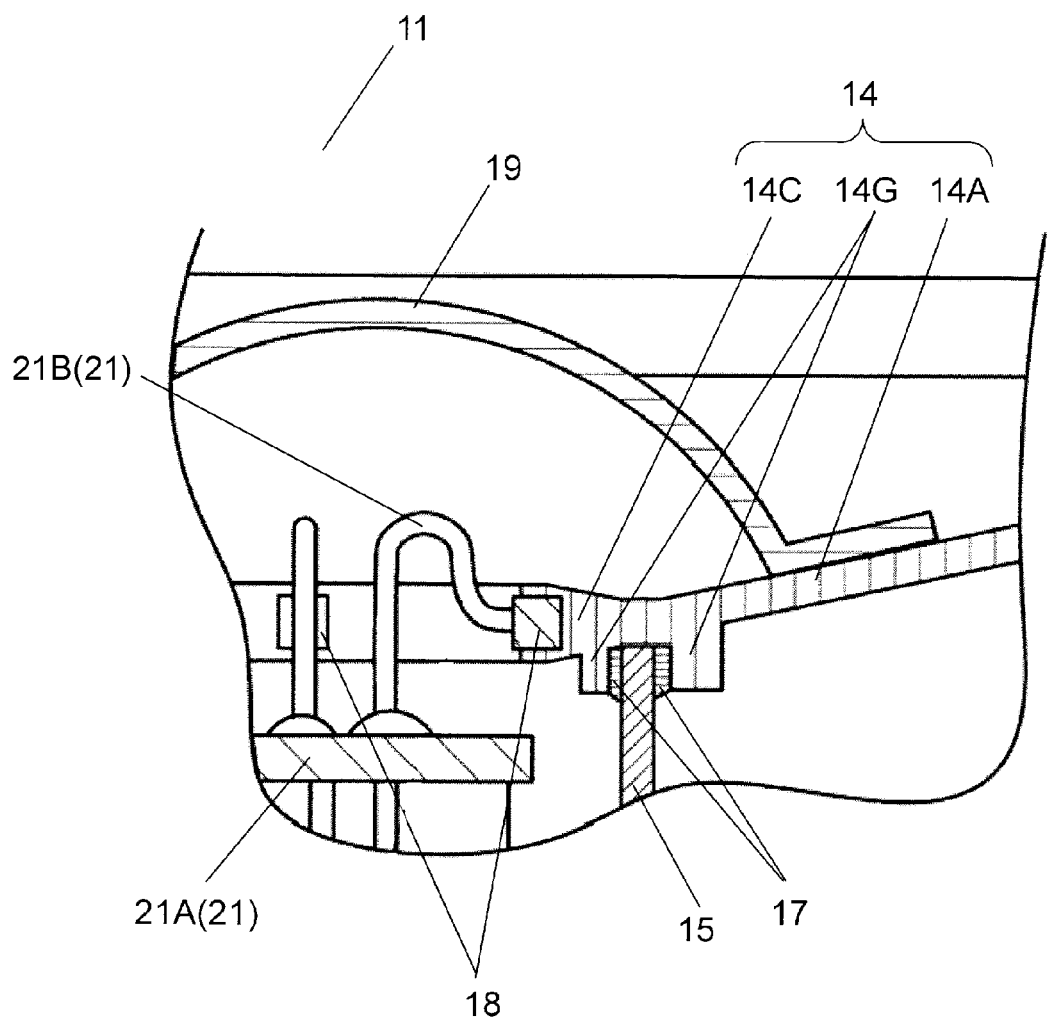
FIG. 9 is an enlarged sectional view of a principal part of a loudspeaker in a case where a voice coil bobbin is coupled to a back face of a diaphragm and a light-emitting element is embedded in an inner peripheral end portion of the diaphragm in accordance with the exemplary embodiment of the present invention.

Furthermore, as shown in FIG. 9, LED 18 may be coupled to inner peripheral end portion 14C by embedding a part or an entire part of LED 18 into inner peripheral end portion 14C. With this configuration, since coupling of LED 18 can be carried out at the same time when diaphragm 14 is molded, the productivity is improved.

Figure 10:
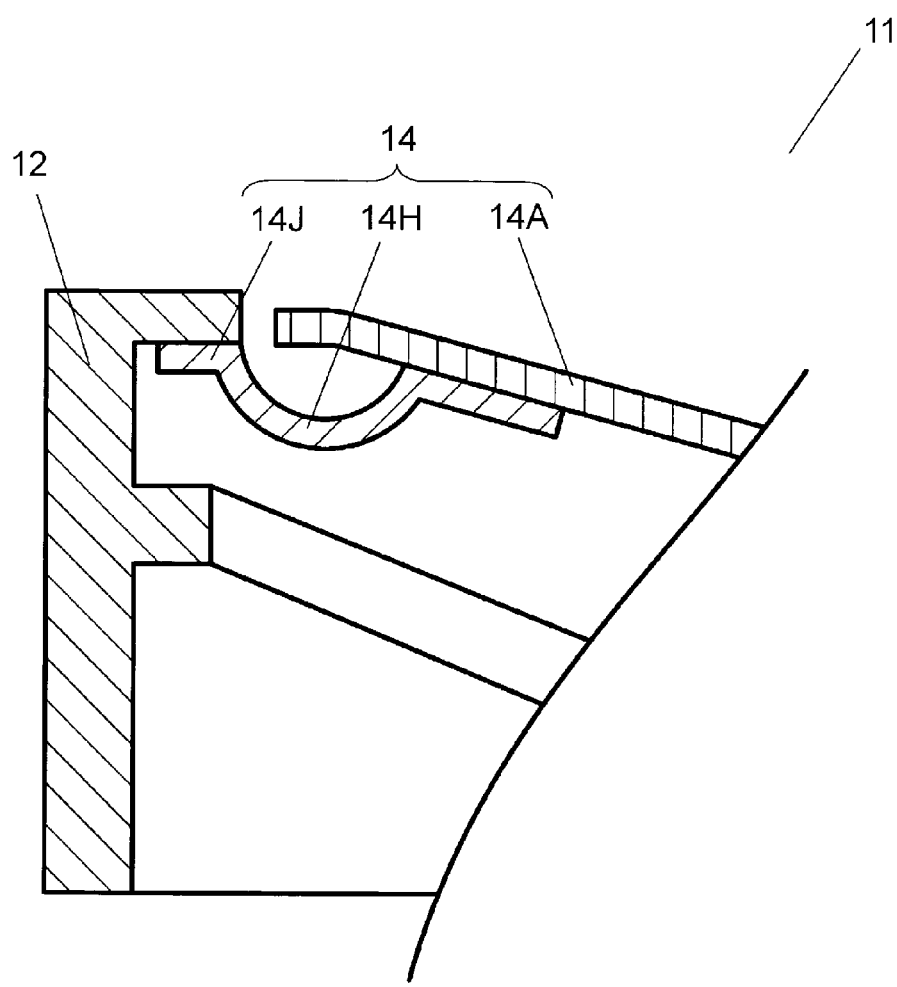
FIG. 10 is an enlarged sectional view of a principal part of a loudspeaker in a case where an edge is linked to a back face of a diaphragm in accordance with the exemplary embodiment of the present invention.

FIG. 10 is an enlarged sectional view of a principal part of the loudspeaker in a case where edge 14H is linked to the back face of diaphragm 14. In this case, it is preferable that edge 14H is linked so as to protrude to the back face side of diaphragm 14. With this configuration, the front face of light-guide portion 14A does not have a portion covered with edge 14H, diaphragm 14 can be extended to a position further extending in the outer peripheral direction from the linking part to edge 14H. Consequently, a light emitting area of diaphragm 14 can be enlarged.

Note here that as shown in FIG. 1, magnetic circuit 13 is preferably an external magnetic type. In a case where magnetic circuit 13 is of an external magnetic type, magnetic circuit 13 includes yoke 13A, magnet 13B, and plate 13C. Note here that yoke 13A has a pole piece in the center thereof. In this case, it is preferable that the pole piece of yoke 13A is provided with a through-hole through which lead wire 21B is allowed to pass. Yoke 13A is formed of magnetic substance material such as iron. Therefore, when yoke 13A is produced, the through-hole can be easily formed in the pole piece.

Note here that magnetic circuit 13 is not necessarily limited to the external magnetic type, it may be of an internal magnet type. In this case, printed wiring board 21A is disposed above magnet 13B. However, it is difficult to process a hole in magnet 13B. Thus, in the case where magnetic circuit 13 is of an internal magnet type, voice coil bobbin 15 is provided with a hole through which lead wire 21B is pulled out.

Furthermore, in a case where there is a gap between the front face of magnetic circuit 13 and printed wiring board 21A, it is preferable that spacer 20 is provided between the front face of magnetic circuit 13 and printed wiring board 21A. Note here that in a case where magnetic circuit 13 is of an external magnetic type, spacer 20 is mounted on the pole piece of yoke 13A.

In addition, it is preferable that loudspeaker 11 includes dust cap 19. Dust cap 19 is provided to the center of diaphragm 14. Note here that it is preferable that dust cap 19 protrudes to the front face side of diaphragm 14. This configuration can include a space between dust cap 19 and magnetic circuit 13, and the space can accommodate LED 18. Furthermore, it is preferable that dust cap 19 has a color, for example, black, having less light-transmittance. This configuration can suppress direct leakage of light of LED 18 from dust cap 19. Therefore, light is emitted only by light-guide portion 14A, so that diaphragm 14 can be decorated with beautiful illumination without irregularity in brightness.

In addition, as an input to drive LED 18, an audio signal to drive loudspeaker 11 is preferably used. With this configuration, light blinks in response to strength of a sound. Furthermore, in a case where full-color type LED 18 is used, it is possible to change luminescent color of diaphragm 14 in synchronization with a sound. Note here that the input to drive LED 18 is not limited to the audio signal to drive loudspeaker 11, but may be an independent input signal.

Figure 11:
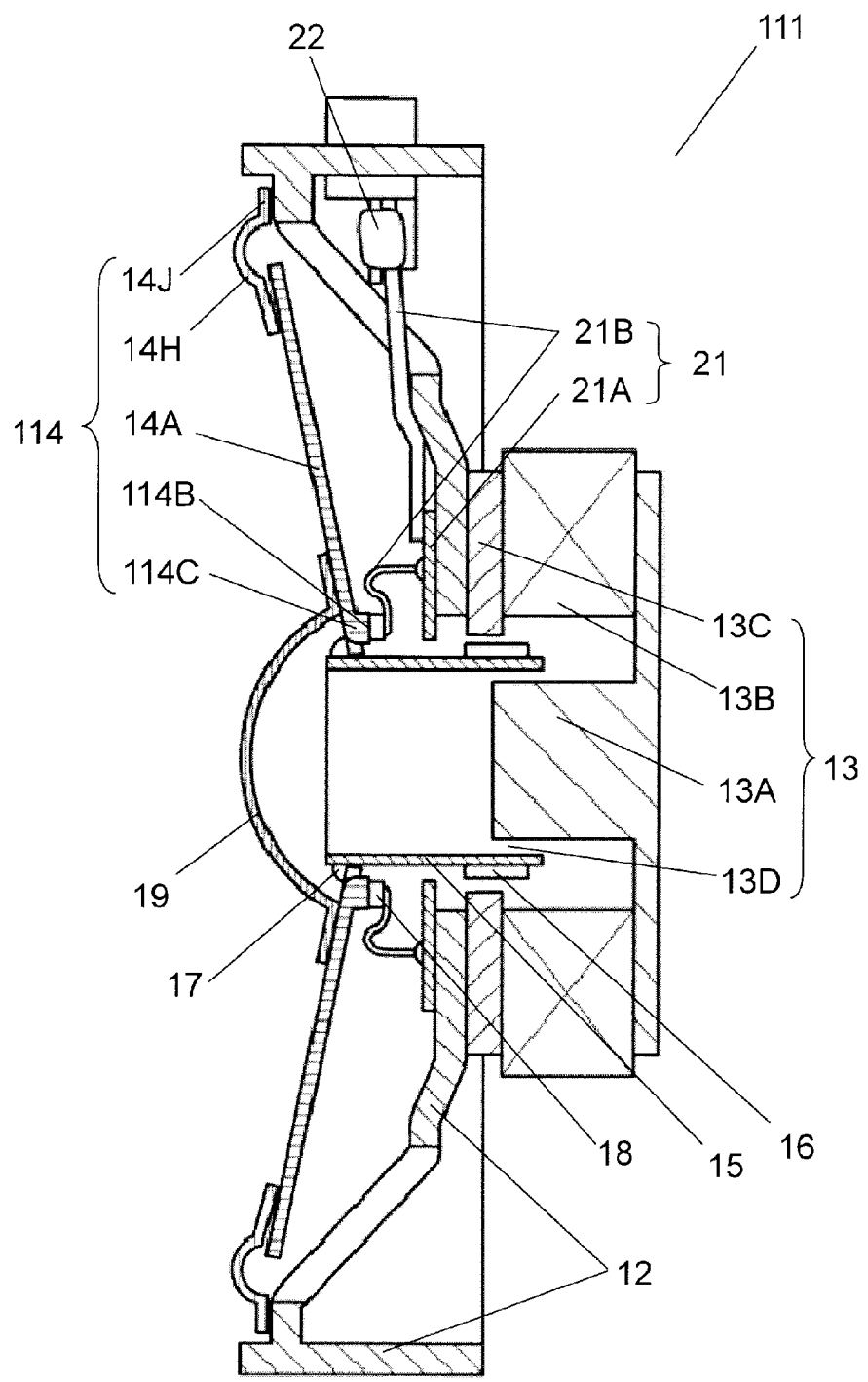
FIG. 11 is a sectional view of a loudspeaker in a case where a diaphragm having a bent inner peripheral end portion is used in accordance with the exemplary embodiment of the present invention.

FIG. 11 is a sectional view of loudspeaker 111 using diaphragm 114 having bent inner peripheral end portion 114C instead of diaphragm 14 shown in FIG. 1. LED 18 outputs light toward the back face of diaphragm 114. That is to say, loudspeaker 111 is different from loudspeaker 11 shown in FIG. 1 in the direction in which light of LED 18 is output.

Inner peripheral end portion 114C of diaphragm 114 is bent toward the second end along the outer peripheral surface of voice coil bobbin 15. That is to say, end face 114B is disposed to face the back side of diaphragm 114 at inner peripheral end portion 114C. LED 18 is coupled to end face 114B. Light emitted from LED 18 enters diaphragm 114 from end face 114B.

As shown in FIG. 11, printed wiring board 21A is disposed on the front face of the center of frame 12. LED 18 is coupled to external terminals 22 via printed wiring board 21A by two lead wires 21B.

Magnetic circuit 13 may be of an external magnetic type or an internal magnet type. In a case where magnetic circuit 13 is of an external magnetic type, printed wiring board 21A may be mounted on the front face of the center of plate 13C.

It is preferable that inner peripheral end portion 114C is formed so that a gap is provided between the lateral surface at the inner side of inner peripheral end portion 114C and the outer peripheral surface of voice coil bobbin 15. With this configuration, a distance between the end portion of printed wiring board 21A and voice coil bobbin 15 can be increased. That is to say, even if rolling occurs in voice coil bobbin 15, it is possible to suppress contact between voice coil bobbin 15 and LED 18.

Figure 12:
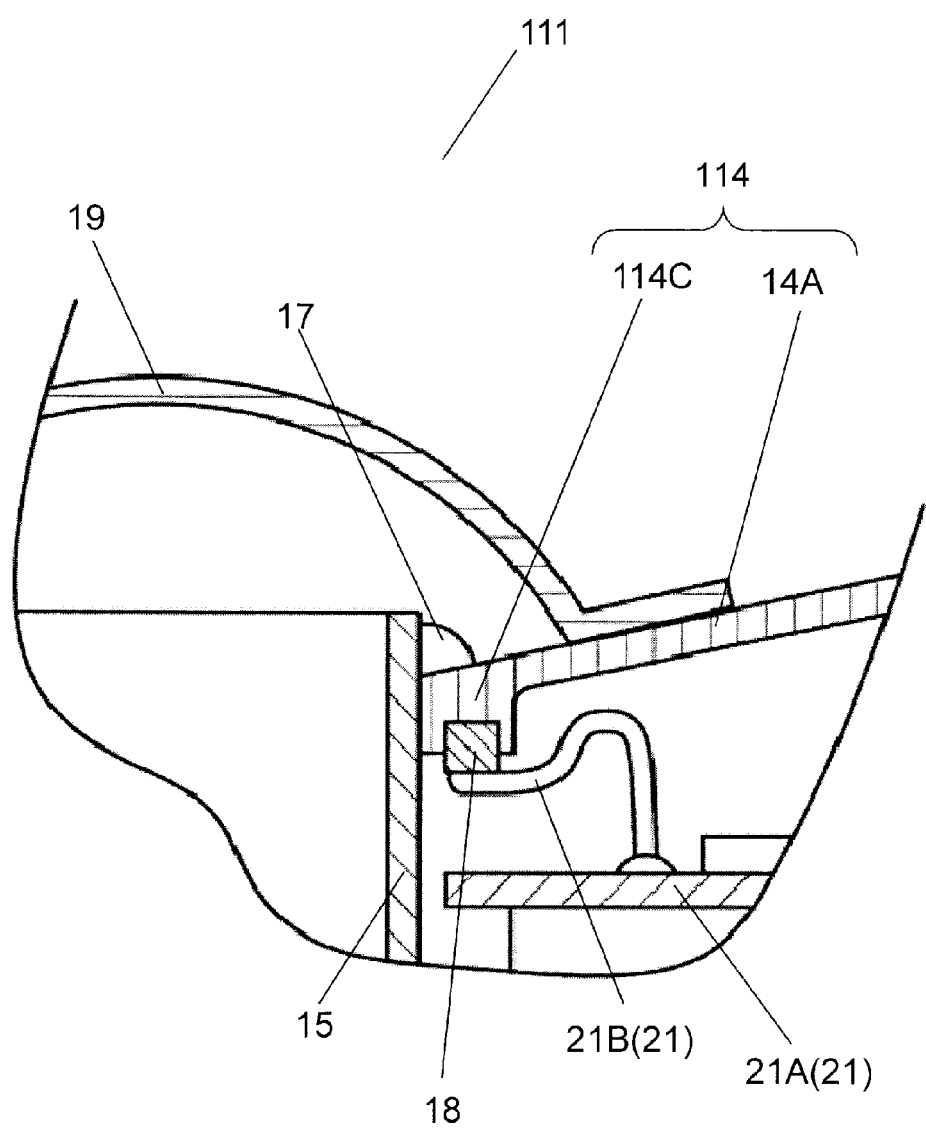
FIG. 12 is an enlarged sectional view of a principal part of a loudspeaker in a case where a bent inner peripheral end portion of a diaphragm and a voice coil bobbin are coupled to each other in accordance with the exemplary embodiment of the present invention.

Each of FIG. 12 to FIG. 15 is a sectional view of an essential part of loudspeaker 111. FIG. 12 is an enlarged sectional view of a principal part of the loudspeaker in which bent inner peripheral end portion 114C and the outer peripheral surface of voice coil bobbin 15 are coupled to each other. The lateral surface of inner peripheral end portion 114C is in contact with the outer peripheral surface of voice coil bobbin 15. Inner peripheral end portion 114C and voice coil bobbin 15 are coupled to each other with adhesive-bonding portion 17. Thus, when the lateral surface of inner peripheral end portion 114C and the outer peripheral surface of voice coil bobbin 15 are adhesively bonded to each other, the strength of coupling between diaphragm 114 and voice coil bobbin 15 is improved.

LED 18 may be coupled to inner peripheral end portion 14C by embedding a part or an entire part of LED 18 into inner peripheral end portion 114C. With this configuration, since coupling of LED 18 can be carried out at the same time when diaphragm 14 is molded, the productivity is improved.

Figure 13:
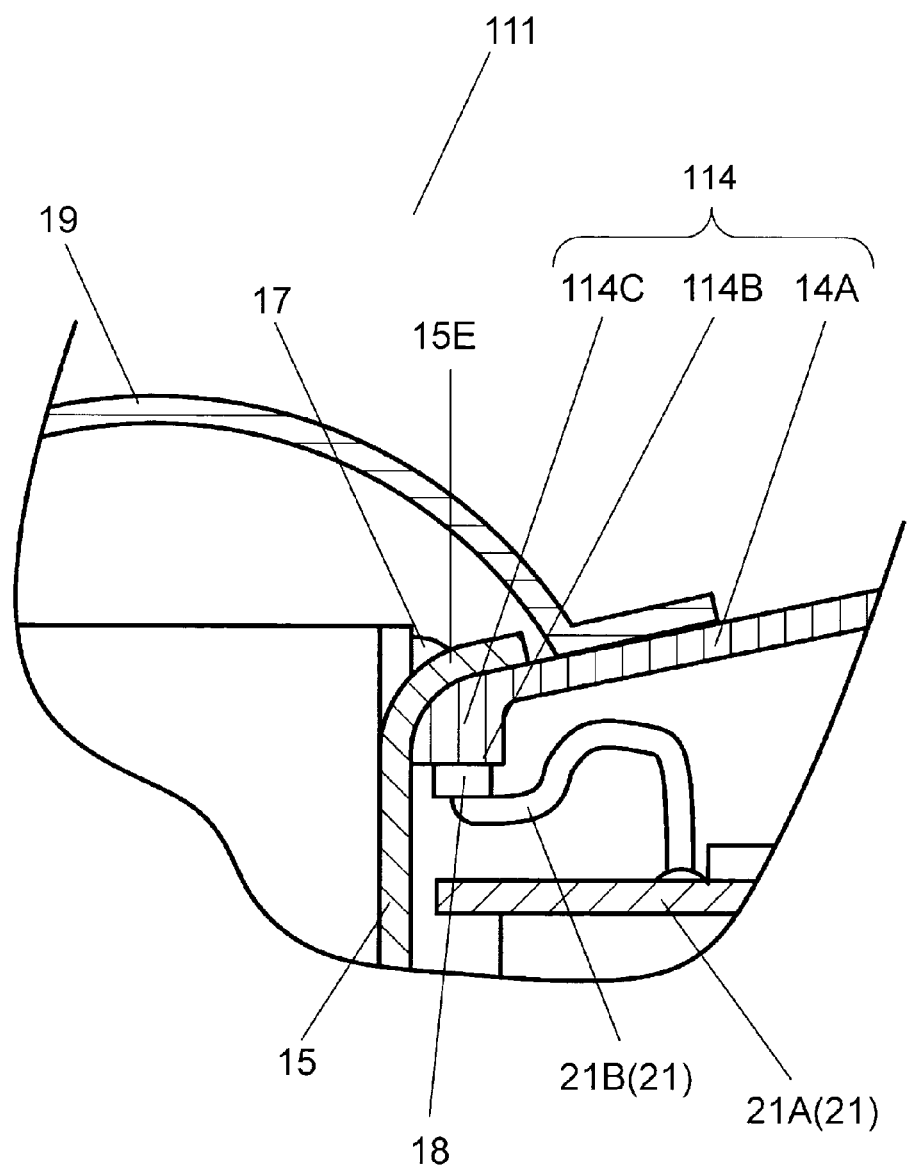
FIG. 13 is an enlarged sectional view of a principal part of a loudspeaker in a case where a bent inner peripheral end portion of a diaphragm and a bent voice coil bobbin are coupled to each other in accordance with the exemplary embodiment of the present invention.

Furthermore, as shown in FIG. 13, it is preferable that voice coil bobbin 15 has bent portion 15E at the first end thereof, and bent portion 15E bends outwardly along the front face of diaphragm 114. With this configuration, light is reflected by the first end of voice coil bobbin 15. Thus, light of LED 18 can be efficiently guided to light-guide portion 14A.

In this case, it is preferable that voice coil bobbin 15 is formed of a member capable of reflecting light. This configuration enables light of LED 18 to be efficiently guided to light-guide portion 14A.

Furthermore, it is preferable that bent portion 15E at the first end of voice coil bobbin 15 is adhesively coupled to the front face of diaphragm 114. With this configuration, the strength of coupling between voice coil bobbin 15 and diaphragm 114 is further improved.

Figure 14:
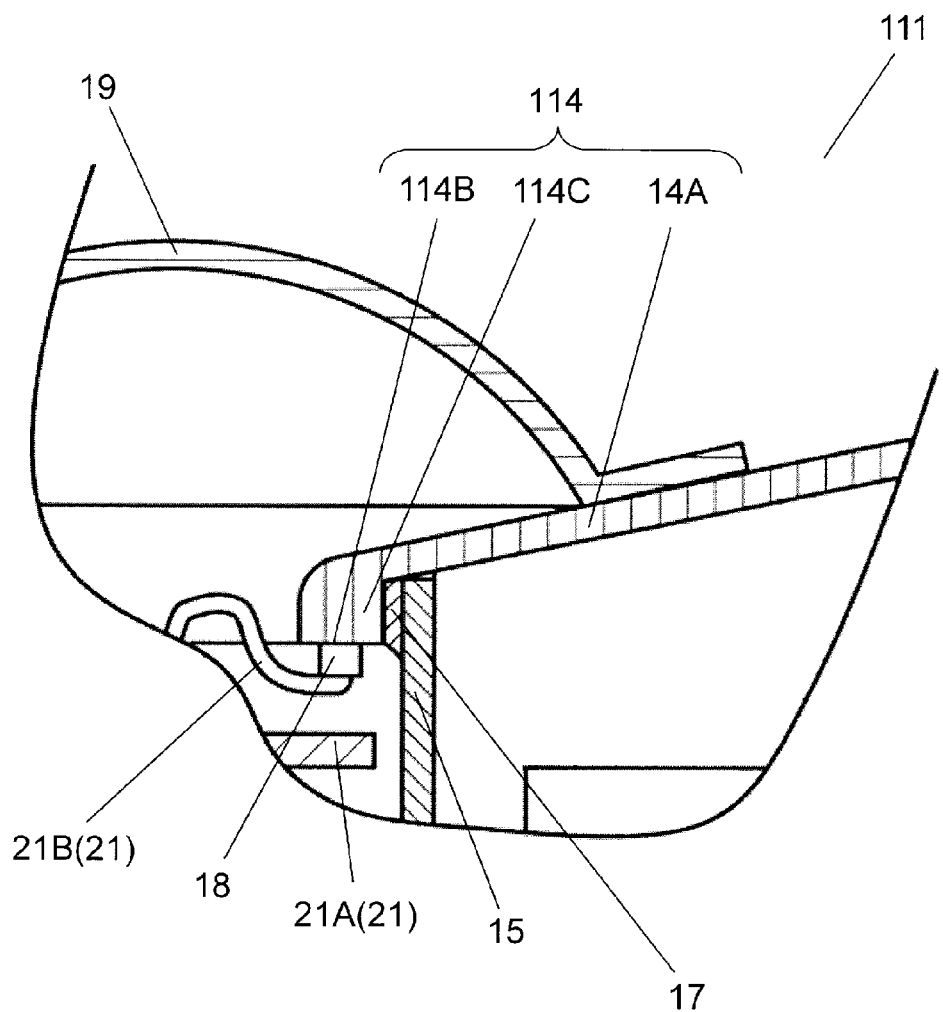
FIG. 14 is an enlarged sectional view of a principal part of a loudspeaker in a case where a bent inner peripheral end portion of a diaphragm is disposed at an inner side of a voice coil bobbin in accordance with the exemplary embodiment of the present invention.

FIG. 14 is an enlarged sectional view of a principal part of loudspeaker 111 in a case where bent inner peripheral end portion 114C is disposed at the inner side of voice coil bobbin 15. Inner peripheral end portion 114C may be bent along the inner peripheral surface of voice coil bobbin 15. Furthermore, it is preferable that the outer lateral surface of inner peripheral end portion 114C and the inner peripheral surface of voice coil bobbin 15 are coupled to each other. Note here that in this case, printed wiring board 21A is disposed at the inner side of voice coil bobbin 15.

In loudspeaker 111 shown in any one of FIGS. 11 to 14, inner peripheral end portion 114C may be formed around the back face of diaphragm 114 along the outer peripheral surface or the inner peripheral surface of voice coil bobbin 15. With this configuration, the strength of coupling between diaphragm 114 and voice coil bobbin 15 is further improved. Alternatively, inner peripheral end portion 114C may be disposed only in a position of the front face of LED 18. With this configuration, diaphragm 114 can be light. In addition, it is preferable that inner peripheral end portion 114C is disposed in a position hidden by dust cap 19.

Figure 15:
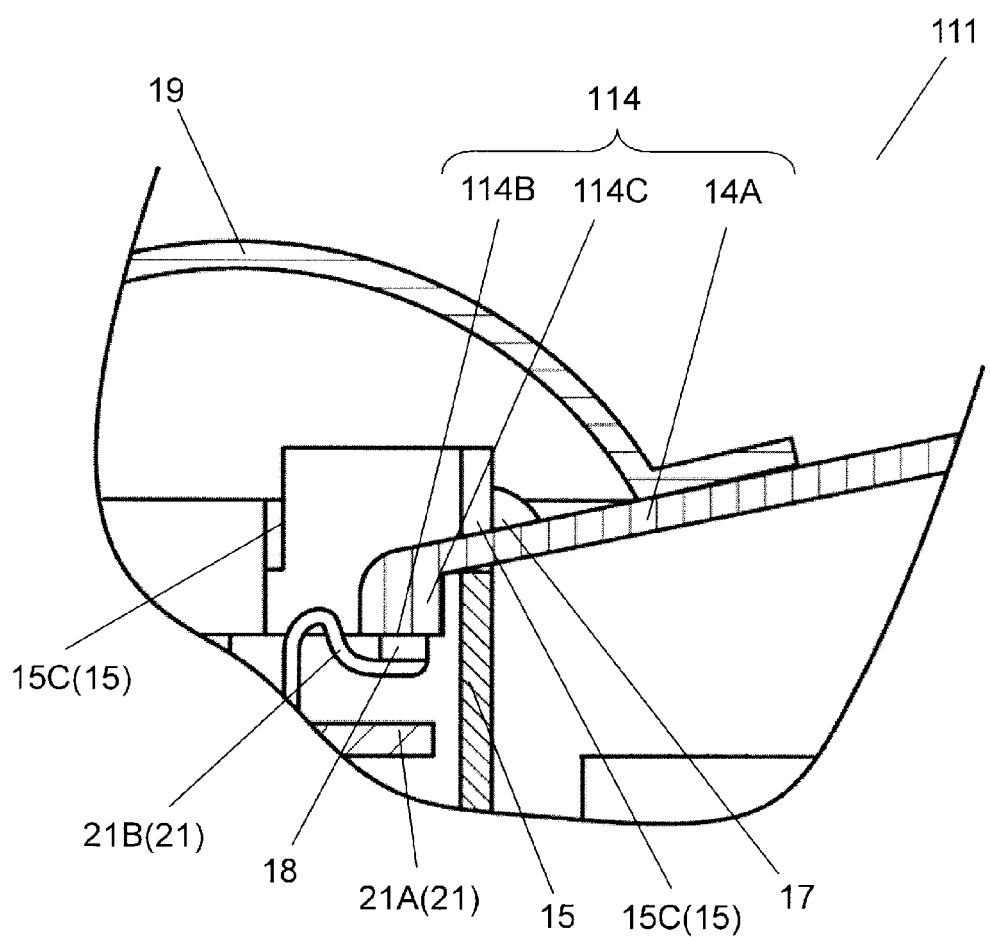
FIG. 15 is an enlarged sectional view of a principal part of a loudspeaker in a case where a voice coil bobbin provided with a notch is used and a bent inner peripheral end portion of a diaphragm is disposed at an inner side of a voice coil bobbin in accordance with the exemplary embodiment of the present invention.

FIG. 15 is an enlarged sectional view of a principal part of loudspeaker 111 in a case where inner peripheral end portion 114C is disposed at the inner side of voice coil bobbin 15 having notch 15C. That is to say, instead of inner peripheral end portion 14C shown in FIG. 6, inner peripheral end portion 114C is provided. Also in this case, LED 18 emits light toward end face 114B.

In loudspeaker 111 shown in any one of FIGS. 11 to 15, it is preferable that inner peripheral end portion 114C is thicker than light-guide portion 14A. With this configuration, efficiency at which the light output from LED 18 enters light-guide portion 14A can be improved. Furthermore, the strength of coupling between diaphragm 114 and voice coil bobbin 15 is further improved.

Furthermore, in loudspeaker 111 shown in any one of FIGS. 13 to 15, LED 18 may be coupled to inner peripheral end portion 14C by embedding a part or an entire part of LED 18 into inner peripheral end portion 114C. With this configuration, since coupling of LED 18 can be carried out at the same time when diaphragm 114 is molded, the productivity is improved.

Figure 16:
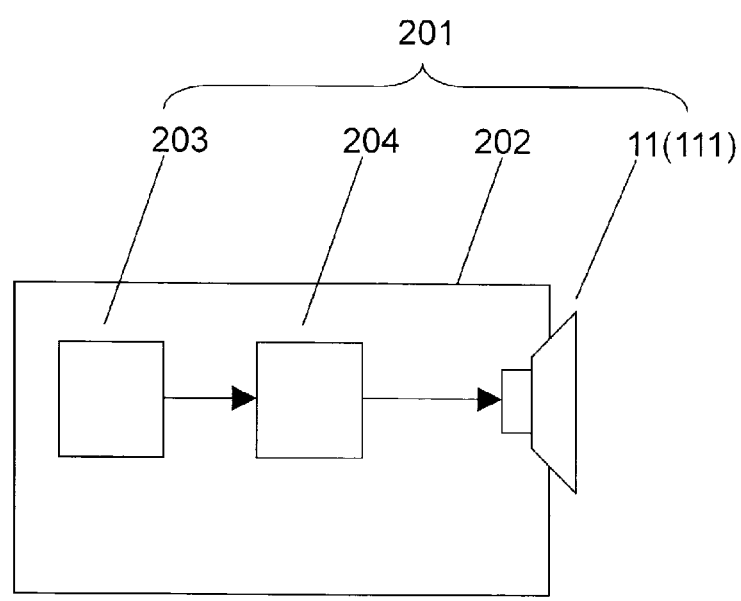
FIG. 16 is a block diagram of an electronic apparatus in accordance with the exemplary embodiment of the present invention.

FIG. 16 is a circuit block diagram of electronic apparatus 201. Electronic apparatus 201 is an amusement machine such as a pachinko machine (Japanese pinball), a pachinko slot machine, and a slot machine. Alternatively, electronic apparatus 201 may be audio equipment such as a minicomponent and a radio-cassette recorder. Furthermore, electronic apparatus 201 may be a game machine emitting sound.

Electronic apparatus 201 includes sound source unit 203, sound processor 204, and loudspeaker 11. Sound source unit 203 and sound processor 204 are housed in housing 200. Loudspeaker 11 is installed to housing 200.

Sound source unit 203 is electrically connected to sound processor 204. Sound source unit 203 reads a sound source signal from an unillustrated sound source, and outputs it to sound processor 204. The sound source stores a sound source signal. Examples of the sound source include CD (compact disc), DVD (digital versatile disc), record, cassette tape, and other various memories.

Output ends of sound processor 204 are electrically connected to external terminals 22 of loudspeaker 11. Sound processor 204 includes at least an amplifier, and amplifies the sound source signal. Note here that sound processor 204 may further include a digital/analog (D/A) converter, and the like.

With the above-mentioned configuration, a viewer can enjoy a sound as well as beautiful illumination of patterns and images of light.

Figure 17:
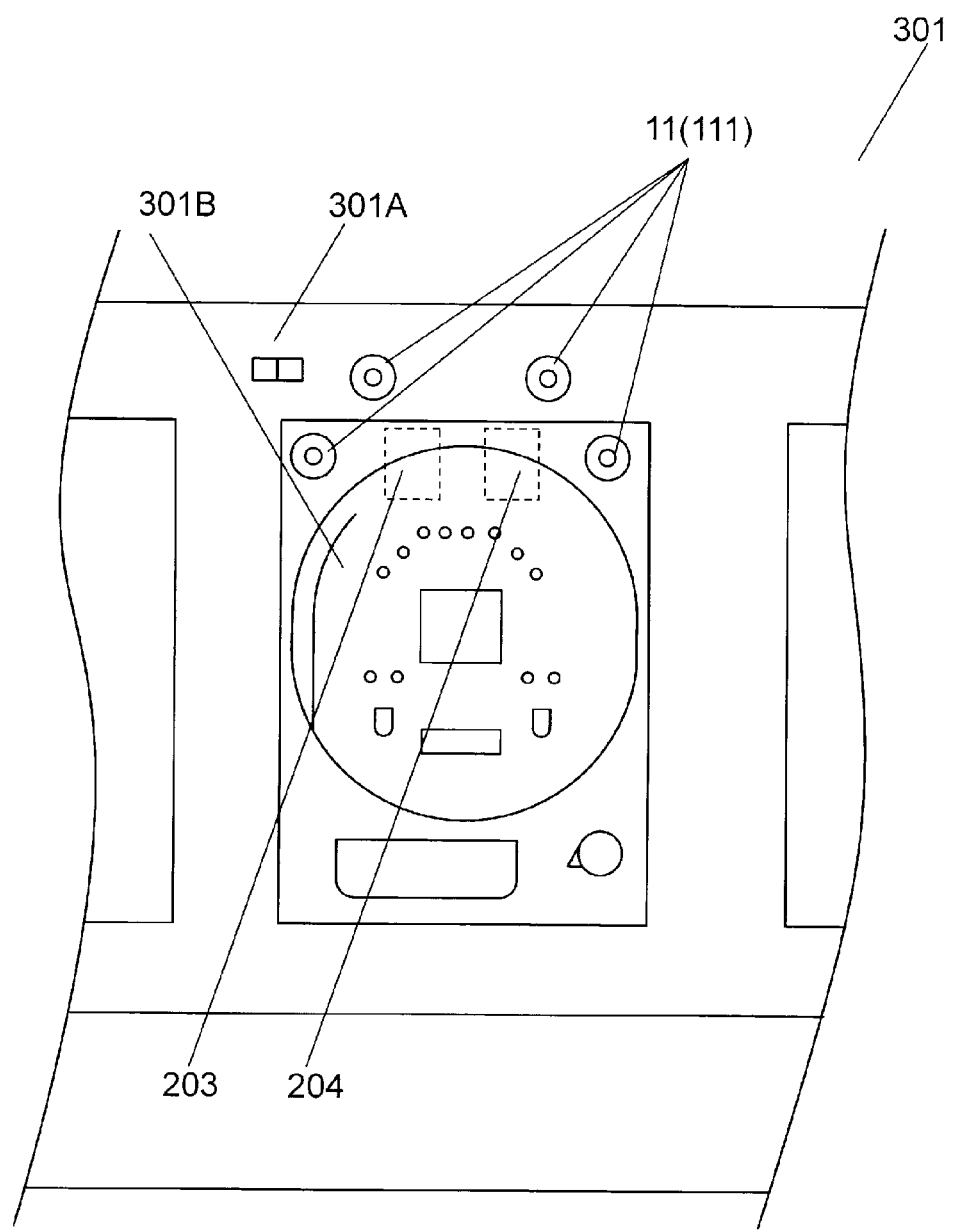
FIG. 17 is a conceptual diagram of another electronic apparatus in accordance with the exemplary embodiment of the present invention.

FIG. 17 is a conceptual diagram of electronic apparatus 301. Electronic apparatus 301 includes main body 301A and play table 301B, sound source unit 203, sound processor 204, and loudspeaker 11. Note here that main body 301A incorporates a plurality of play tables 301B. Each of play tables 301B includes sound source unit 203, sound processor 204, and loudspeaker 11. In addition, also main body 301A may be provided with loudspeaker 11. Loudspeaker 11 outputs sound and light in response to the output of sound processor 204.

With this configuration, a game player can enjoy the sound output from play table 301B as well as illumination by loudspeaker 11 while the game player plays the game. Therefore, the game player can further enjoy the game on play table 301B.

Note here that main body 301A includes a switch (not shown) by which a game player can notify a staff member of an amusement facility of abnormality of a game machine or the like. Thus, loudspeaker 11 provided to main body 301A may be configured to emit specific light in response to an instruction by an operation of the switch.

Figure 18:
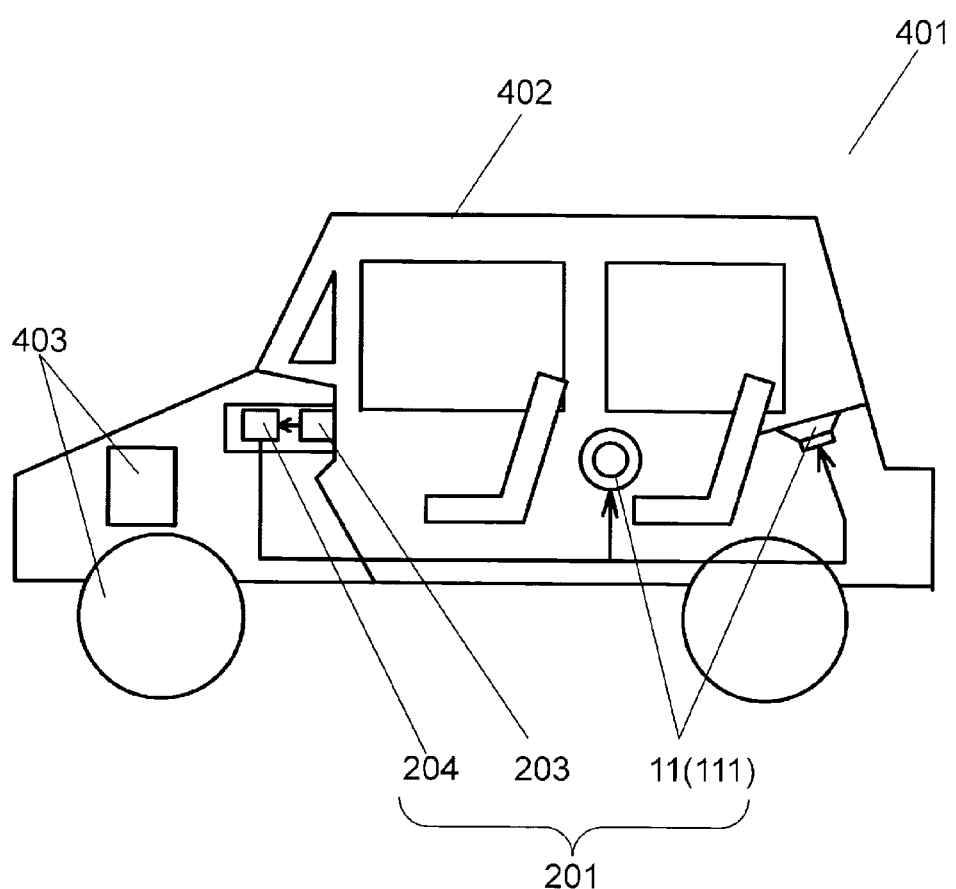
FIG. 18 is a conceptual diagram of a mobile apparatus in accordance with the exemplary embodiment of the present invention.

FIG. 18 is a conceptual diagram of a mobile apparatus in accordance with the present exemplary embodiment. Examples of mobile apparatus 401 include an automobile. Note here that mobile apparatus 401 is not limited to an automobile, and examples thereof may include amusement vehicles such as a go-cart and a Ferris wheel, an aircraft, a ship, a two-wheeled vehicle such as a motorcycle and a bicycle, a forklift truck, or the like.

Mobile apparatus 401 includes main body 402, drive unit 403, sound source unit 203, sound processor 204, and loudspeaker 11. Drive unit 403 includes an engine or a motor. In addition, drive unit 403 may include a tire, a screw, or a caterpillar, a transmission, and a control unit such as steering wheel and an accelerator. At least a part of drive unit 403, sound source unit 203, and sound processor 204 are housed in the main body. Loudspeaker 11 is disposed to a position in main body 402 such that a passenger board on mobile apparatus 401 can hear the sound.

With a configuration mentioned above, the passenger board on mobile apparatus 401 can enjoy a sound as well as beautiful illumination of patterns and images of light.

Note here that in a case where loudspeaker 11 is mounted on a forklift truck, it is possible to notify persons in the surrounding of the forklift truck of approach of the forklift truck by sound and light.

In addition, in a case where loudspeaker 11 is mounted on the outside of amusement vehicles such as a go-cart or a Ferris wheel, not only persons board on the vehicles but also persons who are not on board on the vehicles can enjoy illumination.

Note here that electronic apparatus 201, electronic apparatus 301, and mobile apparatus 401 may include loudspeaker 111 instead of loudspeaker 11.

INDUSTRIAL APPLICABILITY

A loudspeaker in accordance with the present invention has an advantageous effect that the loudspeaker can be decorated by beautiful illumination of patterns and images of light, and is useful as a loudspeaker used in electronic apparatuses and mobile apparatuses.

The invention claimed is:

1. A loudspeaker comprising:
   a light-emitting element;
   a frame;
   a magnetic circuit coupled to the frame and provided with a magnetic gap;
   a diaphragm including:
      an inner peripheral end portion having an end face to which the light-emitting element is coupled;
      a light-guide portion provided in a direction toward an outer periphery from the inner peripheral end portion;
      a reflective surface provided on a back face of the light-guide portion; and
      an outer peripheral end portion coupled to the frame,
   a cylindrical voice coil bobbin having a first end coupled to the inner peripheral end portion, and a second end inserted into the magnetic gap, and
   a voice coil wound on the second end of the voice coil bobbin.

2. The loudspeaker according to claim 1, wherein the light-emitting element is coupled to the inner peripheral end portion of the diaphragm via the voice coil bobbin.

3. The loudspeaker according to claim 2, wherein the voice coil bobbin is made of transmissive material.

4. The loudspeaker according to claim 2, wherein the inner peripheral end portion of the diaphragm is coupled to an outer peripheral surface of the voice coil bobbin, the voice coil bobbin has a window formed therethrough, and the light-emitting element is disposed to the window.

5. The loudspeaker according to claim 4, wherein the end face of the diaphragm has a shape along the outer peripheral surface of the voice coil bobbin.

6. The loudspeaker according to claim 1, further comprising a reflection-preventing layer interposed between the light-emitting element and the end face of the diaphragm.

7. The loudspeaker according to claim 1, wherein the inner peripheral end portion of the diaphragm protrudes toward an inner side of the voice coil bobbin.

8. The loudspeaker according to claim 7, wherein the voice coil bobbin has a bending portion formed in the first end and coupled to a back face of the diaphragm.

9. The loudspeaker according to claim 8, wherein the bending portion bends toward an outer side of the voice coil bobbin.

10. The loudspeaker according to claim 7, wherein the first end of the voice coil bobbin is provided with a notch, and the inner peripheral end portion of the diaphragm passes through the notch.

11. The loudspeaker according to claim 7, wherein a back face of the diaphragm is provided with a projection coupled to at least one of an outer peripheral surface and an inner peripheral surface of the voice coil bobbin.

12. The loudspeaker according to claim 1, wherein the inner peripheral end portion of the diaphragm bends along an inner peripheral surface or an outer peripheral surface of the voice coil bobbin, and is coupled to the inner peripheral surface or the outer peripheral surface of the first end at the voice coil bobbin.

13. The loudspeaker according to claim 1, wherein the light-emitting element is disposed to a back face side of the inner peripheral end portion of the diaphragm.

14. The loudspeaker according to claim 1, wherein the inner peripheral end portion of the diaphragm is thicker than the light-guide portion of the diaphragm.

15. The loudspeaker according to claim 1, wherein the reflective surface of the diaphragm is provided with a plate-shaped projection.

16. The loudspeaker according to claim 1, wherein at least a part of the light-emitting element is embedded in the inner peripheral end portion of the diaphragm.

17. An electronic apparatus comprising:
a sound source unit configured to output a sound source signal;
a sound processor to which an output of the sound source unit is electrically connected, and
the loudspeaker according to claim 1, electrically connected to the sound processor.

18. A mobile apparatus comprising:
a main body;
a drive unit provided to the main body;
a sound source unit housed in the main body and configured to output a sound source signal;
a sound processor to which an output of the sound source unit is electrically connected, and
the loudspeaker according to claim 1, installed in the main body and electrically connected to the sound processor.

* * * * *